(12) United States Patent
Brooks et al.

(10) Patent No.: US 7,149,960 B1
(45) Date of Patent: Dec. 12, 2006

(54) METHOD AND APPARATUS FOR CONTROLLING CREATION AND MANAGEMENT OF PAGES OF PORTAL CONTENT IN A DIRECTORY

(75) Inventors: Matthew G. Brooks, Orem, UT (US); Shawn Matthew Holmstead, Lehi, UT (US); Timothy C. Crabb, Lehi, UT (US); Timothy P. Schmanski, Lindon, UT (US); Shawn C. Lynn, Orem, UT (US); Boyd H Timothy, Provo, UT (US)

(73) Assignee: Novell, Inc., Provo, UT (US)

( * ) Notice: Subject to any disclaimer, the term of this patent is extended or adjusted under 35 U.S.C. 154(b) by 735 days.

(21) Appl. No.: 10/198,005

(22) Filed: Jul. 17, 2002

(51) Int. Cl.
*G06F 17/24* (2006.01)
(52) U.S. Cl. ........................ 715/501.1; 707/7
(58) Field of Classification Search ..... 715/500.1–501, 715/513–516, 790, 797, 804, 738, 748, 749, 715/760, 501.1; 719/311; 709/201–207, 709/217–219; 707/1–10, 101–103 Z; 713/200–202; 726/4, 26–30
See application file for complete search history.

(56) References Cited

U.S. PATENT DOCUMENTS

| | | | |
|---|---|---|---|
| 6,029,245 A * | 2/2000 | Scanlan | 726/4 |
| 6,209,036 B1 * | 3/2001 | Aldred et al. | 709/229 |
| 6,286,001 B1 * | 9/2001 | Walker et al. | 707/9 |
| 6,560,639 B1 * | 5/2003 | Dan et al. | 709/218 |
| 6,784,883 B1 * | 8/2004 | Allor | 345/419 |
| 2002/0103778 A1 * | 8/2002 | Saxena | 707/1 |
| 2003/0005002 A1 * | 1/2003 | Chen et al. | 707/515 |
| 2003/0050986 A1 | 3/2003 | Matthews et al. | |
| 2003/0110272 A1 * | 6/2003 | du Castel et al. | 709/229 |
| 2004/0199603 A1 * | 10/2004 | Tafla et al. | 709/217 |
| 2004/0205572 A1 * | 10/2004 | Fields et al. | 715/513 |

\* cited by examiner

*Primary Examiner*—William Thomson
*Assistant Examiner*—Charles Anya
(74) *Attorney, Agent, or Firm*—Marger Johnson & McCollom, P.C.

(57) ABSTRACT

Portal pages and overlays are assigned globally unique identifiers (GUIDs). Users are granted permission to view portal pages and overlays by having their user object in the container hierarchy be associated with the GUIDs. User objects can be directly associated with the GUIDs, or can inherit the GUIDs from a container or group. Once the user object is (directly or indirectly) associated with the GUID assigned to a portal page or overlay, the user can view the portal page or overlay.

21 Claims, 15 Drawing Sheets

METHOD AND APPARATUS FOR CONTROLLING CREATION AND MANAGEMENT OF PAGES OF PORTAL CONTENT IN A DIRECTORY

RELATED APPLICATION DATA

This application is related to U.S. patent application Ser. No. 10/119,784, titled "Method and Apparatus For Controlling Access to Portal Content From Outside the Portal," filed Apr. 9, 2002, U.S. patent application Ser. No. 10/066,465, titled "Method and Apparatus To Dynamically Provide Web Content Resources In a Portal," filed Jan. 30, 2002, U.S. patent application Ser. No. 10/066,368, titled "Method to Dynamically Determine a User's Language for the Internet," filed Jan. 30, 2002, and U.S. patent application Ser. No. 09/823,731, titled "A Hierarchical Directory Based Method and Apparatus for Controlling Customized User Web Content Within an Internet Portal," filed Mar. 29, 2001, all of which are hereby incorporated by reference.

FIELD OF THE INVENTION

This invention pertains to portal web pages, and more particularly to the accessing of portal web pages based on individual users.

BACKGROUND OF THE INVENTION

Prior U.S. patent applications Ser. No. 10/119,784, titled "Method and Apparatus For Controlling Access to Portal Content From Outside the Portal," filed Apr. 9, 2002, Ser. No. 10/066,465, titled "Method and Apparatus To Dynamically Provide Web Content Resources In a Portal," filed Jan. 30, 2002, U.S. patent application Ser. No. 10/066,368, titled "Method to Dynamically Determine a User's Language for the Internet," filed Jan. 30, 2002, and U.S. patent application Ser. No. 09/823,731, titled "A Hierarchical Directory Based Method and Apparatus for Controlling Customized User Web Content Within an Internet Portal," filed Mar. 29, 2001, describe various elements used in managing content for users in a portal. For example, U.S. patent application Ser. No. 10,119,784 teaches a method and apparatus for applying security to pages in a portal, even when the content is not viewed through the portal. And U.S. patent application Ser. No. 10/066,465 teaches how users can view portal content in different languages without having to identify language-specific pages in the portal.

These patent applications do not address the question of portal page management. Although users can design a portal page just for themselves, it can happen that a user would prefer to view a portal page designed by another user. In a system where each user is responsible for maintaining his own portal page, the usual solution is for the user to copy the design of the other user's portal page. But if the other user changes his portal design, this change is not propagated to any users that copied the design for their own portal pages.

Another issue involving portal page management lies in linked pages. Where one page leads to another, a link is commonly offered between the pages. But it can happen that only certain users should have permission to view one of the pages. In that case, whether or not the link is provided, and whether or not the user can view the content on that page, is dependent not on the content of the pages, but on permissions associated with the user.

Related to linked pages are page overlays. A page overlay provides additional content to the user, beyond that included on the portal page. As with linked pages, certain users can have permission to view an overlay, while other users can be denied access to the overlay. Again, whether the user can view the content of the page overlay is dependent on the permissions associated with the user.

A need remains for a way to provide content within a portal that addresses these and other problems associated with the prior art.

SUMMARY OF THE INVENTION

The invention is a method and apparatus for accessing a portal web page. Portal web pages are assigned globally unique identifiers (GUIDs). To allow users access to a portal web page, the GUID of the portal web page is associated with an object (for instance a user object, a container object, a group object, or any other type of object) within a container hierarchy. When a user requests access to the portal web page, the user object in the container hierarchy for the user is checked to see if it is associated with the GUID of the portal web page. Association can be direct or indirect (inherited from a container in the hierarchy or a group object to which the user is a member). If the user object is associated with the requested portal web page, the portal web page is displayed.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
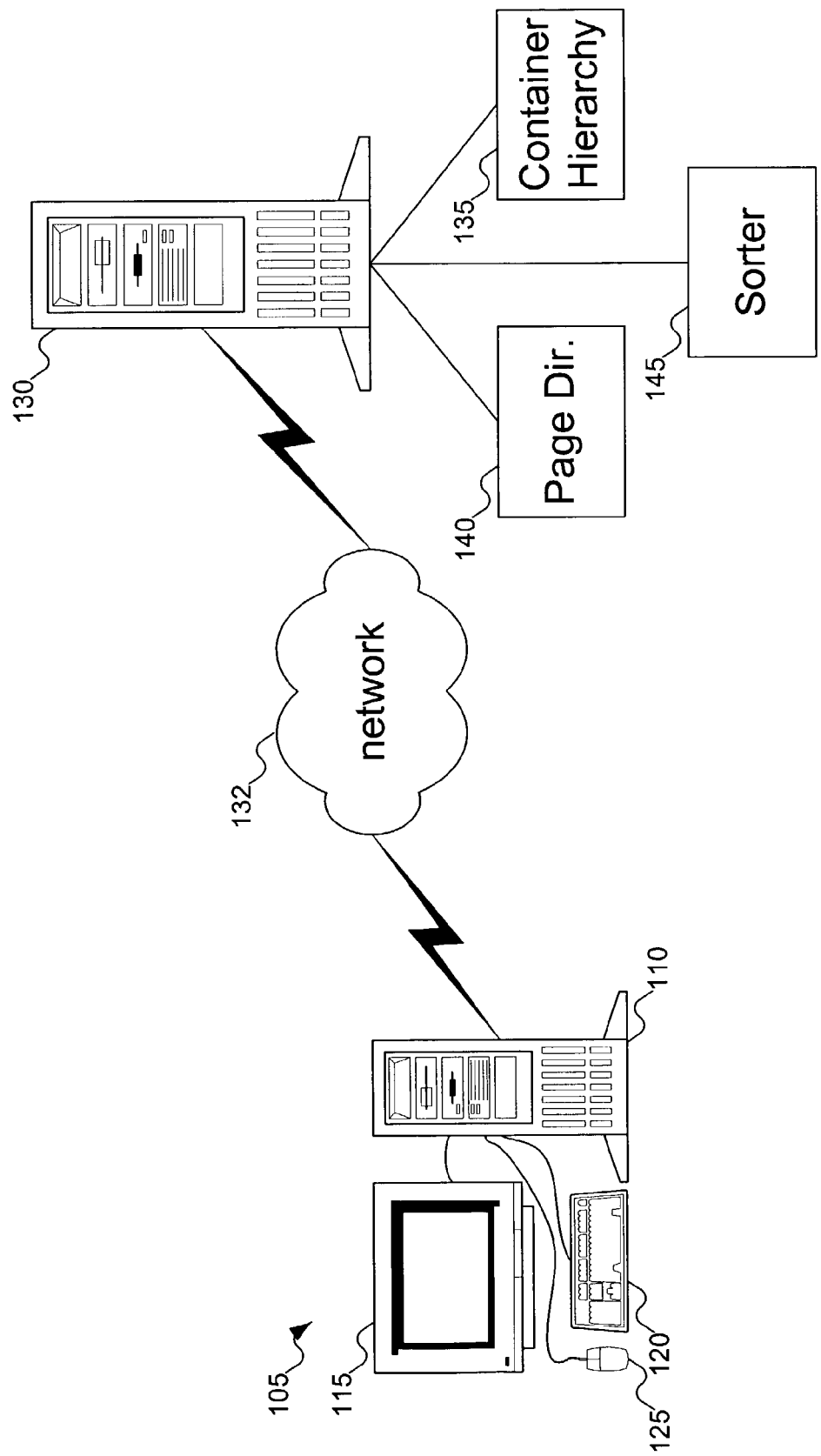
FIG. 1 shows a computer system accessing a portal server via a network, according to an embodiment of the invention.

FIG. 1 shows a computer system accessing a portal server via a network, according to an embodiment of the invention. In FIG. 1, client 105 conventionally includes computer 110, monitor 115, keyboard 120, and mouse 125. A person skilled in the art will recognize that, although the term client is used with reference to computer system 105, the invention is not limited to any traditional definition of a client, and is applicable to any type of computer capable of accessing server 130. For example, client 105 can also be an internet appliance, lacking monitor 115, keyboard 120, or mouse 125. Optional equipment not shown as part of client 105 in FIG. 1 are a printer and other input/output devices. Also not shown in FIG. 1 are the conventional internal components of client 105: e.g., a central processing unit, memory, file system, etc.

Client 105 connects to server 130 via network 132. Network 132 can be any type of network: a local intranet, an extranet, a local area network (LAN), a wide area network (WAN), a wireless network, a global network (such as the Internet), or any other variety of network.

Server 130 includes container hierarchy 135, page directory 140, and sorter 145. Container hierarchy 135 is used to store the hierarchy of objects (user objects, containers, and groups), and is discussed further with reference to FIG. 3 below. Page directory 140 stores portal web pages and page overlays for the portal web pages. Page directory 140 can be implemented as a database in which the portal web pages are stored as records. Page directory 140 is discussed further with reference to FIG. 2 below. Both container hierarchy 135 and page directory 140 can be stored in storage (such as random access memory, a fixed disk, an optical disc, etc.) in server 130. Sorter 145 is responsible for sorting portal web pages and page overlays when there are multiple portal web pages or page overlays, to prioritize their presentation.

Figure 2:
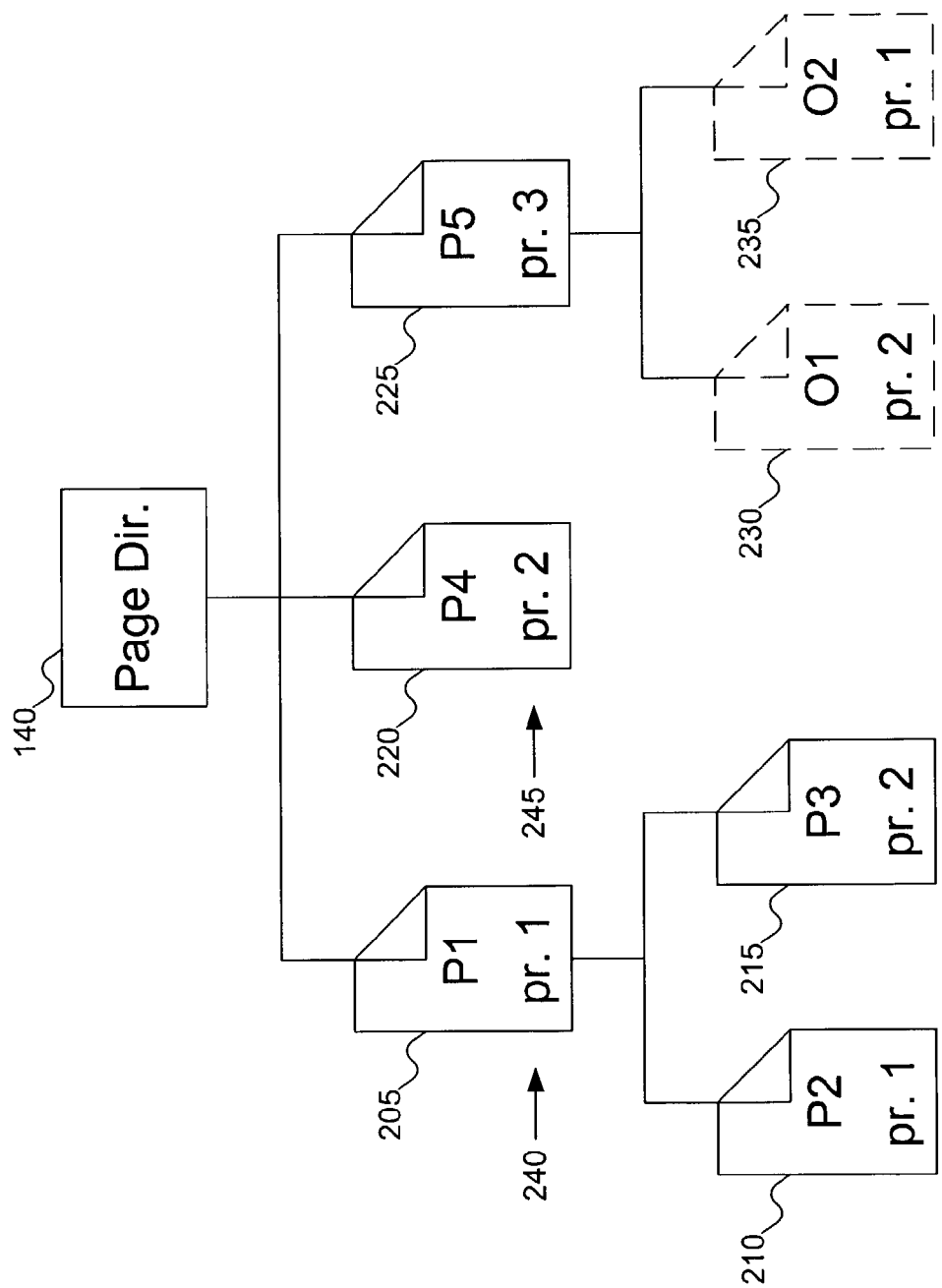
FIG. 2 shows an example of the structure of the page directory of FIG. 1, according to an embodiment of the invention.

FIG. 2 shows an example of the structure of the page directory of FIG. 1, according to an embodiment of the invention. In FIG. 2, five portal web pages (205, 210, 215, 220, and 225) are shown, along with two page overlays (230 and 235). Each portal web page (also referred to as simply page) or page overlay includes content. Although content can be represented as formatted text in the page, other forms of content are possible. For example, as described in related U.S. patent application Ser. No. 10/066,465, titled "Method and Apparatus To Dynamically Provide Web Content Resources In a Portal," filed Jan. 30, 2002, the content can include gadgets which format data using eXtensible Markup Language (XML) and eXtensible Stylesheet Language (XSL). In a preferred embodiment, the content is not fixed on the page or page overlay, but rather is dynamically determined at the time that the content is requested.

Each page and page overlay is assigned a globally unique identifier (GUID). For example, page 1 (205) has the GUID "P1," whereas page 4 (220) has the GUID "P4." Any GUID can be used for any page or page overlay, provided that the GUID is unique within the page directory.

Each page or page overlay can include a priority. In FIG. 2, priority level 1 is considered the highest priority, and higher numbers indicating lower priority. For example, page 1 (205) is assigned a priority level of 1 (240), whereas page 4 (220) is assigned a priority level of 2 (245). As discussed above with reference to FIG. 1, where multiple page or page overlays are to be presented, the pages or page overlays are sorted, so that the highest priority page or page overlay is presented first, then the second highest priority page or page overlay, and so on. A person skilled in the art will also recognize that pages might not need to be assigned a priority, and that other schemes for assigning priority to pages and page overlays can be used.

The organization of the pages and page overlays indicates a hierarchy for the pages. For example, each of the three pages 205, 220, and 225 is the root of a tree of pages. Since there is no higher page in page director 140, pages 205, 220, and 225 are not siblings of each other. But pages 210 and 215, both children of page 205, are siblings of each other. A person skilled in the art will recognize that there can be any number of pages or page overlays in page directory 140, and that there can be any number of levels to page directory 140.

Where a page has children (such as page 205, with child pages 210 and 215) the parent page includes links to the child pages. The order in which the links are presented when the parent page is displayed is determined by the priorities of the child pages. If two child pages have the same priority, the order can be determined by any desired tie-breaking scheme: for example, alphabetically by the page's name. Thus, when page 205 is displayed, the link to page 210 is displayed before the link to page 215. (This all assumes that the user requesting page 205 has permission to view pages 210 and 215 as well. For example, if the user has permission to view page 215 but not page 210, then the link to page 210 is not shown on page 205. And if the user does not have permission to view either of child pages 210 and 215, then no links are presented at all.)

Child pages also display the path back to the root of the tree in page directory 140. For example, if a user is permitted to view page 210, the page includes the path back to page 205, enabling the user to jump back to a higher page in page directory 140.

As mentioned above, parent pages do not include links to child pages that the user is not entitled to view. The reverse, however, is not true. Child pages include the path back to the root of the tree, even if the user is not entitled to view any (or all) of the pages in the path. The reason for this asymmetry is that the parent page that the user does not have permission to view may have another child that the user does have permission to view. Thus, a parent page that a user is not entitled to view is not shown as entirely blank: it includes at the very least links to child page(s) that the user is entitled to view.

Overlays provide a mechanism for offering different content to different users on the same page. If a user has access rights to both the page and a page overlay, the content on the page overlay is added to the page and displayed to the user as if it were all one page of content. Where there are multiple page overlays to a single page, the overlays are overlaid on the page based on their priority level. For example, if a user has access rights in page 225 and both page overlays 230 and 235, the content from page overlay 230 is added to the content of page 225 before the content from page overlay 235 is added, because overlay page 230 has a higher priority. In a preferred embodiment, the page overlay is added at the bottom of the page, but a person skilled in the art will recognize that the content for a page overlay can be added anywhere on the page.

If a user has access to only some of the overlays to a particular page, then the page overlays to which the user does not have access are not presented. For example, if a user has access rights on page 225 and page overlay 235 but not page overlay 230, then only the content of page overlay 235 is added to the content of page 225. Of course, if a user has access to a page but has no access rights in any page overlays, then only the content from the page is presented.

Since the content of a page overlay is added to the content of the page, a user must have access rights in both the page overlay and the page to which the content is added. That is, a user cannot have access rights in a page overlay without access rights to the page on which the content is overlaid.

Figure 3:
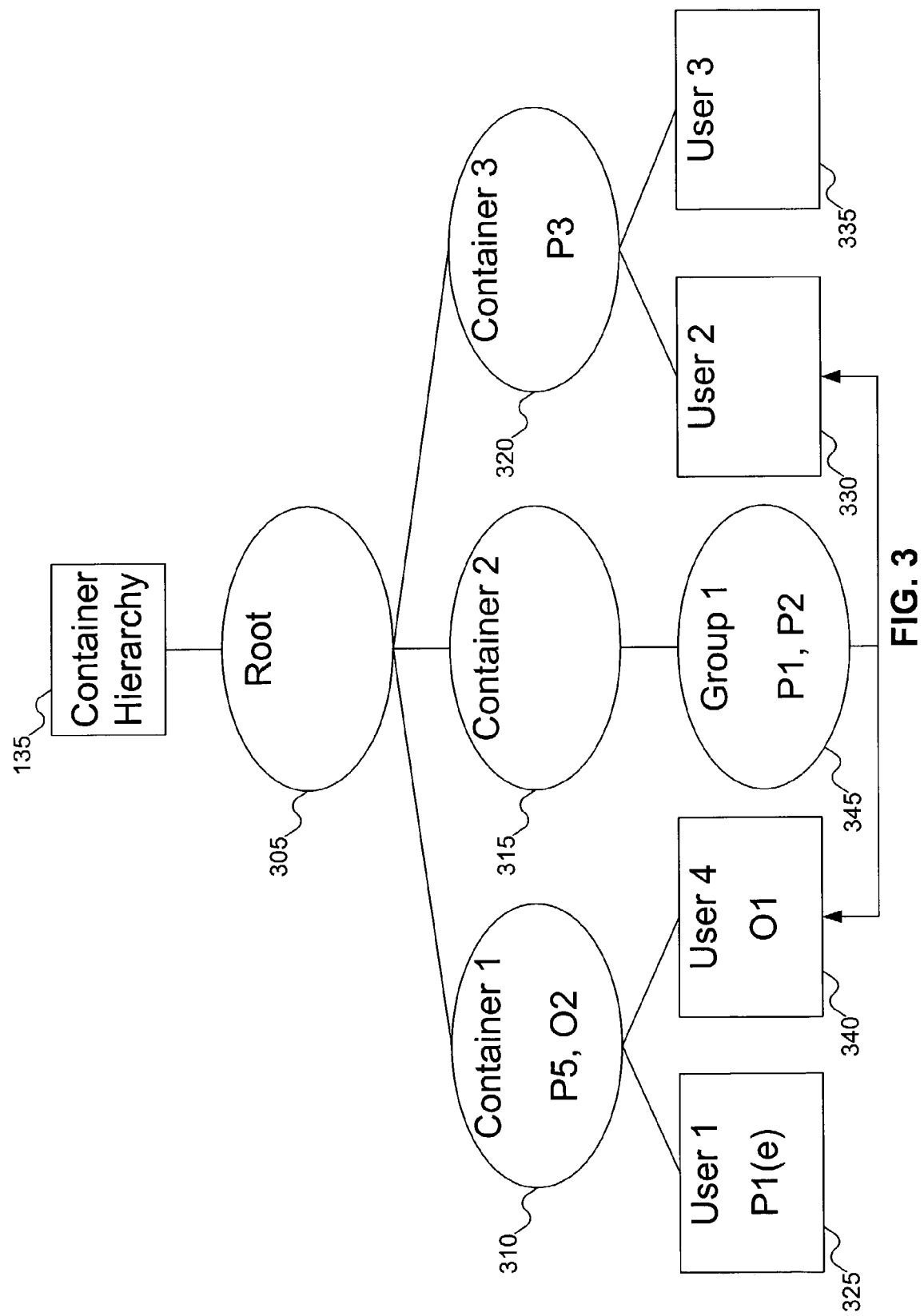
FIG. 3 shows an example of the structure of the container hierarchy of FIG. 1, according to an embodiment of the invention.

FIG. 3 shows an example of the structure of the container hierarchy of FIG. 1, according to an embodiment of the invention. In FIG. 3, root 305 is the root of a container hierarchy. There are three objects below root 305: container 1 (310), container 2 (314), and container 3 (320). Each of containers 1 (310), 3 (315), and 3 320) can further contain objects in the container hierarchy (be they other containers, user objects, groups, or other types of objects). The containers can be organized in any desired fashion and to any purpose. A person skilled in the art will recognize that there are numerous variations on FIG. 3. For example, there can be fewer or more than three containers below root 305.

Containers 1 (310) and 3 320) are expanded, and show directory entries for four individuals. Directory entry 325 is for user 1, directory entry 330 is for user 2, directory entry 335 is for user 3, and directory entry 340 is for user 4. Although FIG. 3 shows two users in each of containers 1 (310) and 3 (320), a person skilled in the art will recognize that there can be any number of users in a container. In addition, a person skilled in the art will recognize that there can be more than three levels in container hierarchy 135.

Each type of object in container hierarchy 135 (be it a container, a group, a user object, or any other type of object) can be assigned rights to access a page or page overlay. For example, a role object in which any given user object could be an occupant at any given time could also be assigned rights to access a page or page overlay. A person skilled in the art will recognize other types of objects that can be included in container hierarchy 135.

Assigning rights to access a page or page overlay is accomplished by storing the GUID of the page or page overlay within the object. In, FIG. 3, various different objects are shown as having differing rights in the pages and page overlays of FIG. 2. For example, user 1 (directory entry 325) is marked as being entitled to access page 1. (The "(e)" flag indicates that user 1 (directory entry 325) is also entitled to modify page 1: this is discussed further below.) Although user 1 (directory entry 325) is directly entitled to access only one page in the page directory, a person skilled in the art will recognize that a directory entry can authorize a user to access any number of pages or page overlays (including zero). For example, users 2 and 3 (directory entries 330 and 335) are not directly flagged as being entitled to access any pages or page overlays, whereas container 1 (310) and group 1 (345) both have flags for two different pages or page overlays.

As just mentioned, FIG. 3 shows group 1 (directory entry 345). A group represents a group of users not contained in a container in container hierarchy 135. Although group 1 (directory entry 345) contains two members, a person skilled in the art will recognize that a group can have any number of members.

In addition, FIG. 3 shows group 1 (directory entry 345) as having direct membership by users. A person skilled in the art will recognize that membership in a group can be direct membership or indirect membership based upon some criteria. The criteria can be anything, such as "users whose first names begin with the letter A," or "users who are managers," for example. Whether group membership is direct or indirect does not have any effect on the ability of group members to view pages or page overlays to which they have access, directly or indirectly.

Not only can directory entries be directly flagged to grant access to pages or page overlays, but directory entries can also inherit the right to access pages or page overlays from other containers containing the object. Thus users 1 and 4 (directory entries 325 and 340) are entitled to access page 5 and page overlay 2 because they are nested within container 1 (310). Users 2 and 3 (directory entries 330 and 335) are entitled to access page 3 because they are nested within container 3 (320). Users 2 and 4 (directory entries 330 and 340) are also entitled to access pages 1 and 2, as they are members of group 1 (345). For reference, the list of users and the pages and page overlays they are entitled to access is shown in Table 1.

TABLE 1

| User Number | Pages/page overlays |
| --- | --- |
| 1 | P1, P5, O2 |
| 2 | P1, P2, P3 |
| 3 | P3 |
| 4 | P1, P2, P5, O1, O2 |

As mentioned earlier, by virtue of the "(e)" designation, user 1 (directory entry 325) is permitted to edit page 1. Having the right to edit a page includes being able to change the layout of the page, changing the content of the page, assigning the GUID of the page to another object in container hierarchy 135 (to let others have the right to view the page), to delete the page, and so on.

Figure 4A:
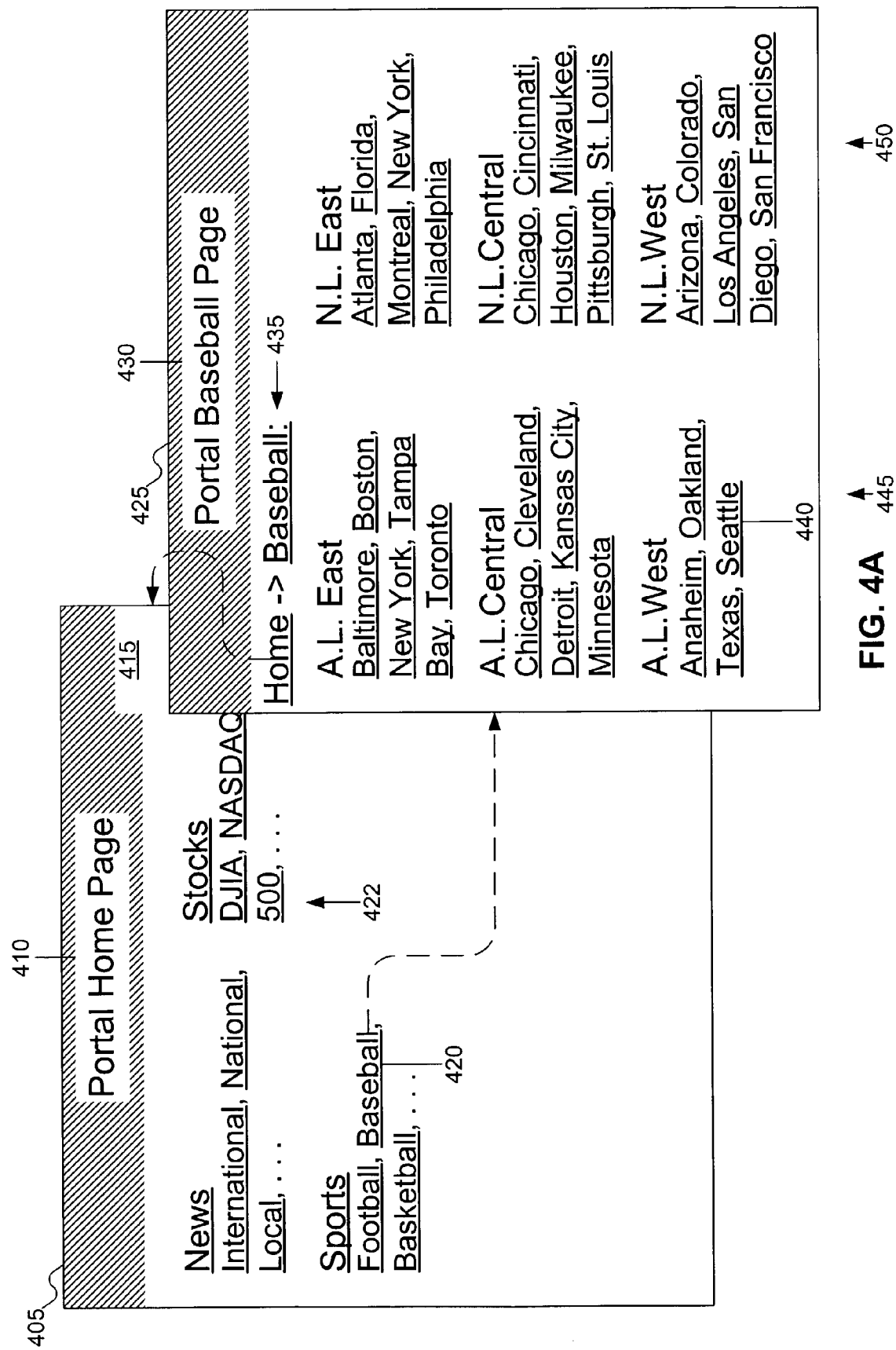
FIGS. 4A and 4B show examples of portal pages from the page directory of FIG. 2 displayed as linked together, according to an embodiment of the invention.
Figure 4B:
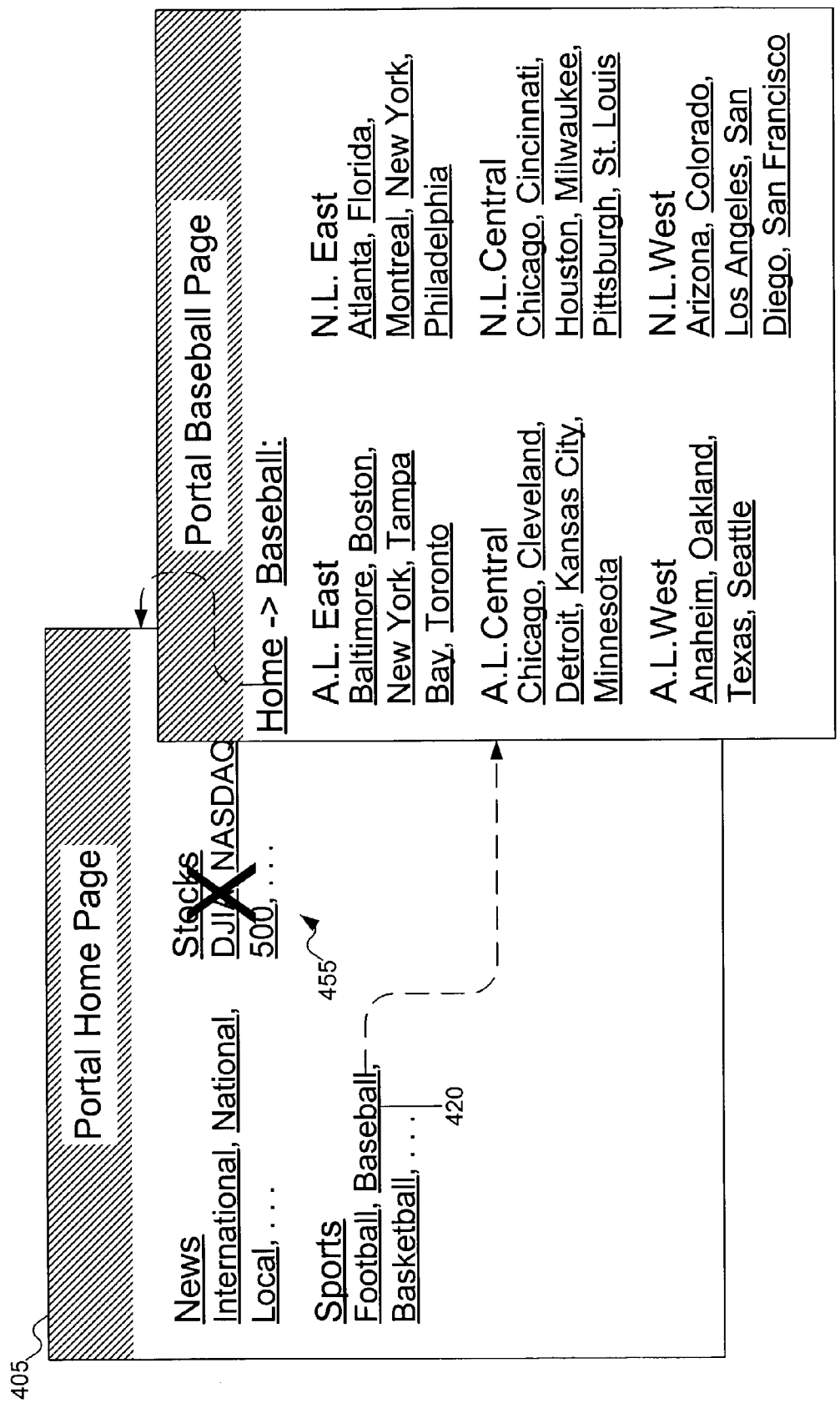

FIGS. 4A and 4B show examples of portal pages from the page directory of FIG. 2 displayed as linked together, according to an embodiment of the invention. For this example, assume that page 405 is P1 (page 205 from FIG. 2), page 425 is P2 (page 210 from FIG. 2), and the stock information (the corresponding page is not shown in FIG. 4) is P3 (page 215 from FIG. 2). Further assume that the user requesting to view page 405 is user number 2 above. Because user number 2 is entitled to view all of pages 205, 210, and 215, page 405 displays itself and the links to both pages 210 and 215.

As shown in FIG. 4A, page 405 includes a title 410, which is offset from the rest of page 405 by color stripe 415. (A person skilled in the art will recognize that page 405, and all other pages and page overlays on FIGS. 4A, 4B, 5A, and 5B, show the content as the user would view it, and not necessarily as the page or page overlay is stored in the page directory.) Page 405 presents links to a number of different sub pages. Since the user is entitled to access the page 425 and the stock page (not shown), page 405 includes links to these pages. For example, when link 420 is selected, page 425 is opened, displaying information about baseball teams. Page 425 includes its own title 430, and shows path 435 from the home page 405 to the current page. Any part of path 435 can be selected, causing the display of the selected page (which would be a parent of page 425). For example, selecting "Home" from path 435 causes the display of page 405.

As discussed above, for page 405 to include a link to a child page, the user must have access rights in the child page. If the user lacked access rights in the child page, then page 405 would not offer a link to the child page. FIG. 4B shows this situation. In FIG. 4B, assume the user is user number 4. Although user number 4 has permission to access pages 205 and 210 (among others) from FIG. 2, user number 4 does not have permission to view page 215, with the stock information. "X" 455 indicates that the link to the page containing information about stocks would not be presented on page 405 to this user. Note that the fact that the user in FIG. 4B is denied access to the stock page does not affect his ability to view baseball page 425.

Figure 5A:
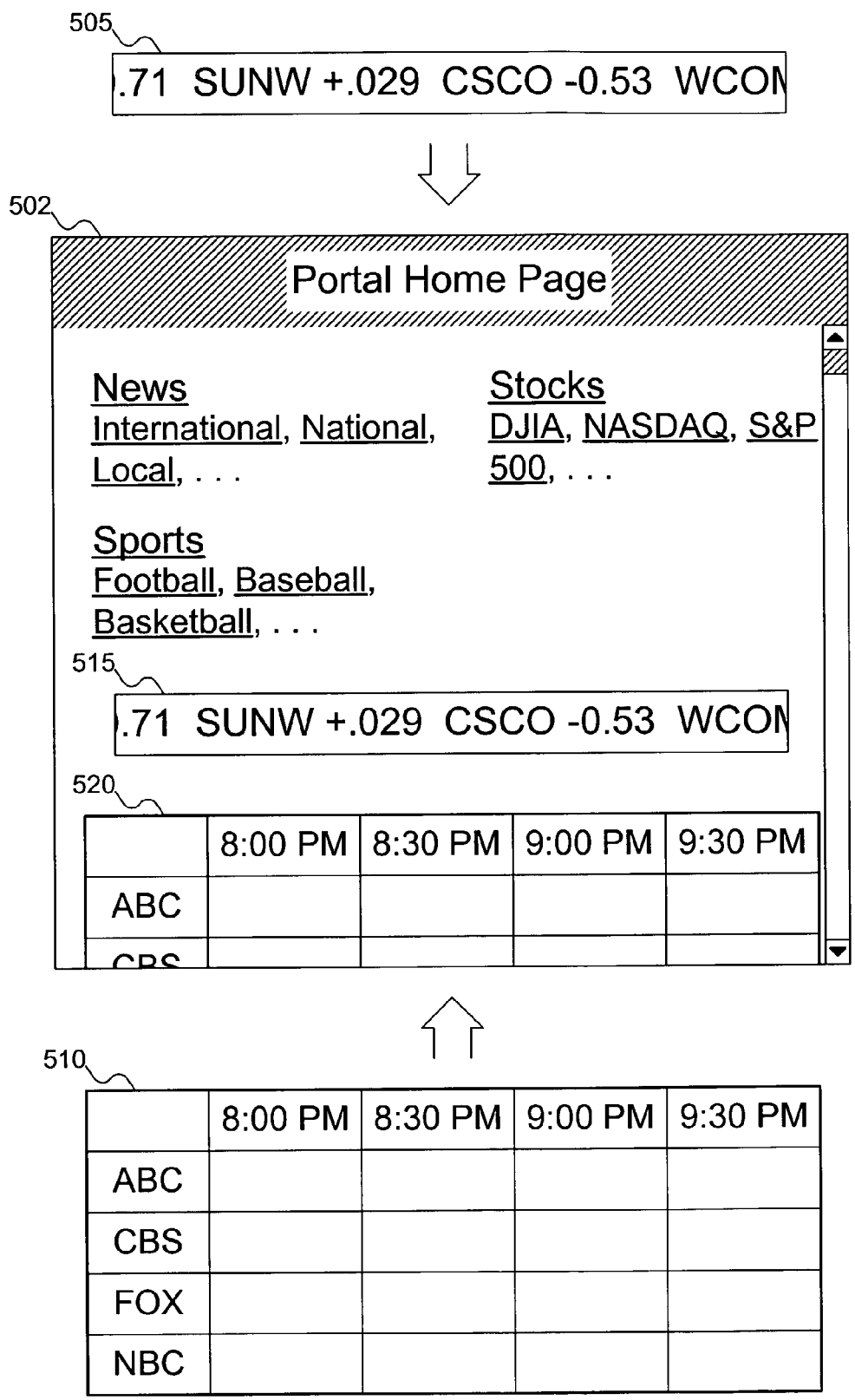
FIGS. 5A and 5B show examples of a portal page combined with page overlays from the page directory of FIG. 2, according to an embodiment of the invention.
Figure 5B:
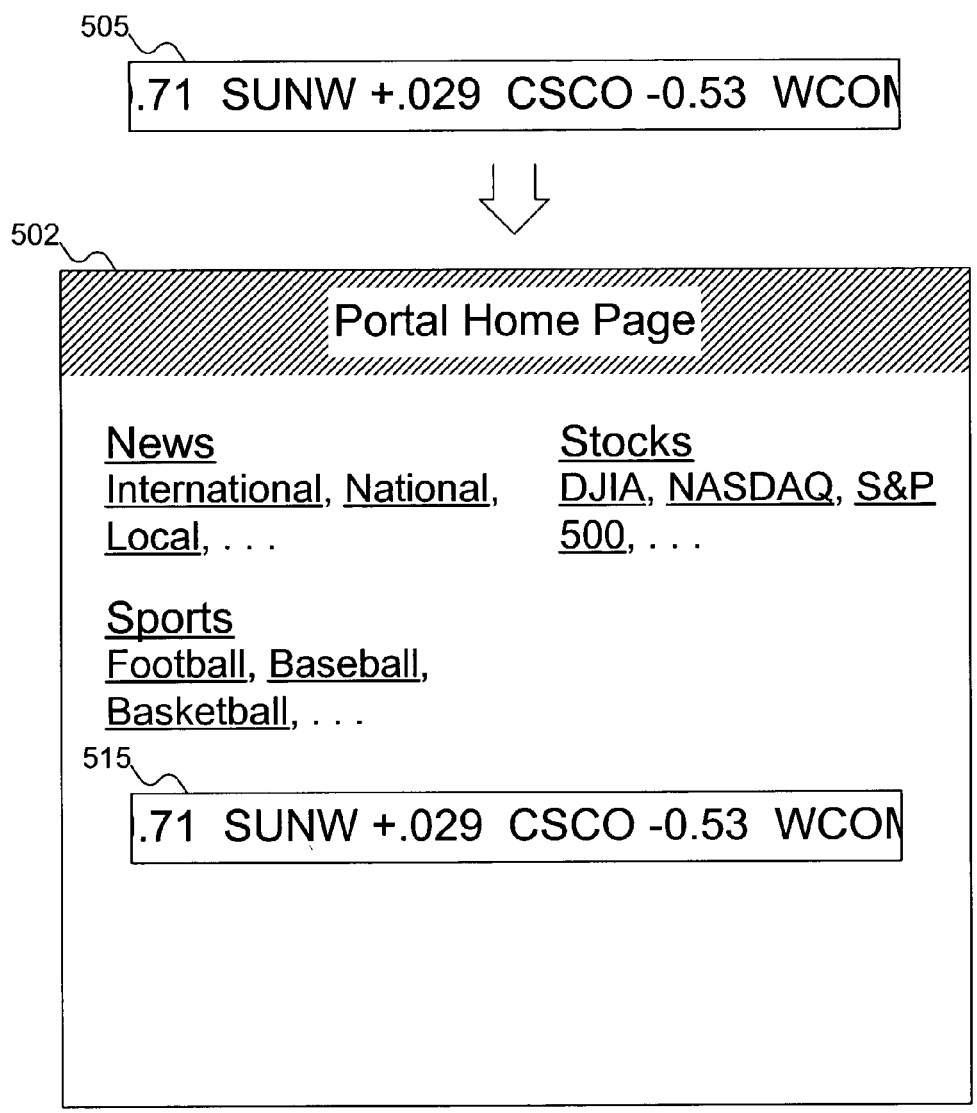

FIGS. 5A and 5B show examples of a portal page combined with page overlays from the page directory of FIG. 2, according to an embodiment of the invention. In FIG. 5A, assume that the user is user number 4, that page 502 is P5 (page 225 from FIG. 2), that page overlay 505 (a stock ticker) is PO2 (page overlay 235 from FIG. 2), and that page overlay 510 (a television grid listing) is PO1 (page overlay 230 from FIG. 2). As shown in FIG. 3, user number 4 has permission to view page 225 and both of page overlays 230 and 235. Because page overlay 505 has higher priority (refer back to FIG. 2 for the priority levels), it is added to the content of page 502 first (as content 515), after which the content from page overlay 510 is presented (as content 520).

In contrast, in FIG. 5B, assume the user is user number 1. User number 1 has permission to view P5 (page 225) and PO2 (page overlay 235 from FIG. 2), but not PO1 (page overlay 230 from FIG. 2). Accordingly, page overlay 505 is added to the content of page 502 (as content 515), but page overlay 510 is not used.

Figure 6:
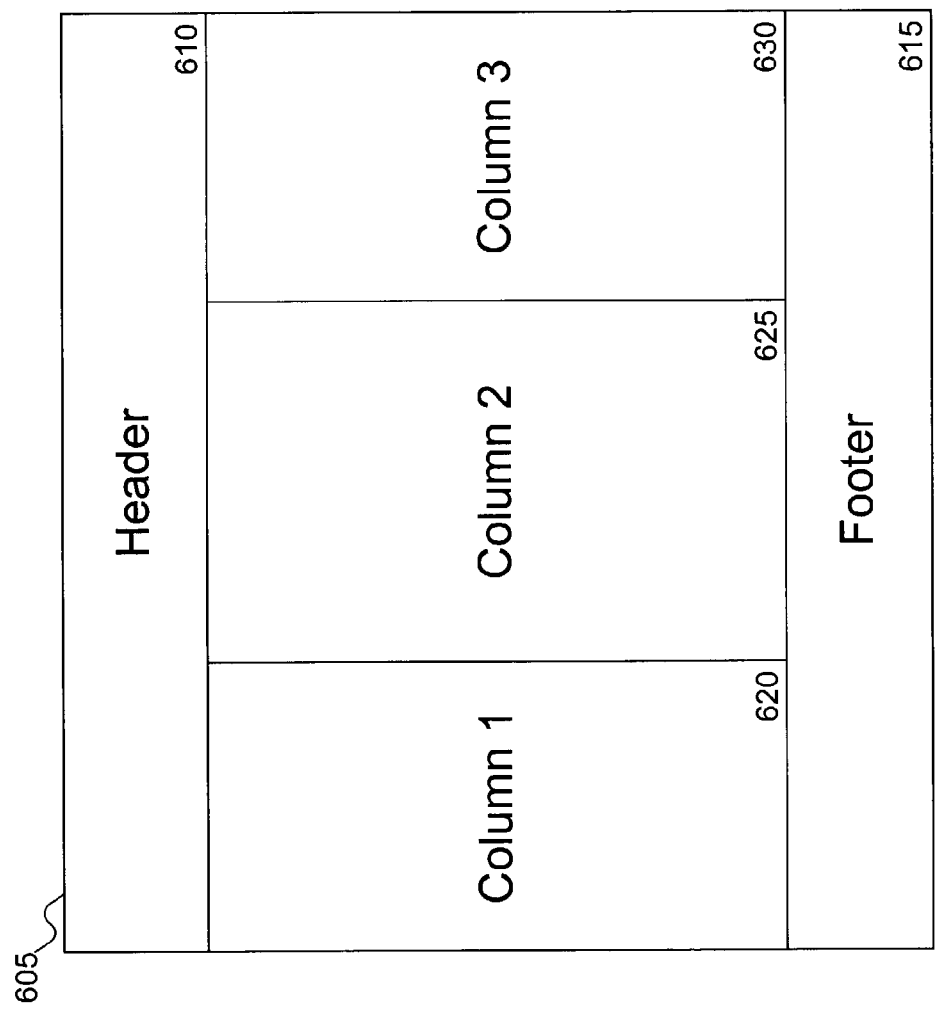
FIG. 6 shows a preferred layout of a page from the page directory of FIG. 2, according to an embodiment of the invention.

FIG. 6 shows a preferred layout of a page from the page directory of FIG. 2, according to an embodiment of the invention. Although the above description treats a content page as having a single display area, in a preferred embodiment the display area is subdivided into five distinct areas. Page 605 in FIG. 6 explains these different areas. In page 605 there is a header 610, a footer 615, and three columns 620, 625, and 630. Content can be positioned in any of the five areas. For example, links to other pages (parent or child) can be positioned in column 1 620, important information can be positioned in header 605, and content that allows a user to change options (such as his password) can be positioned in footer 610. Page overlays can specify not only their priority but also in which area on the page the content is to be overlaid. A person skilled in the art will recognize how to make such modifications to the system and method described herein to achieve this result, and that other variations on page decomposition are possible.

Figure 7:
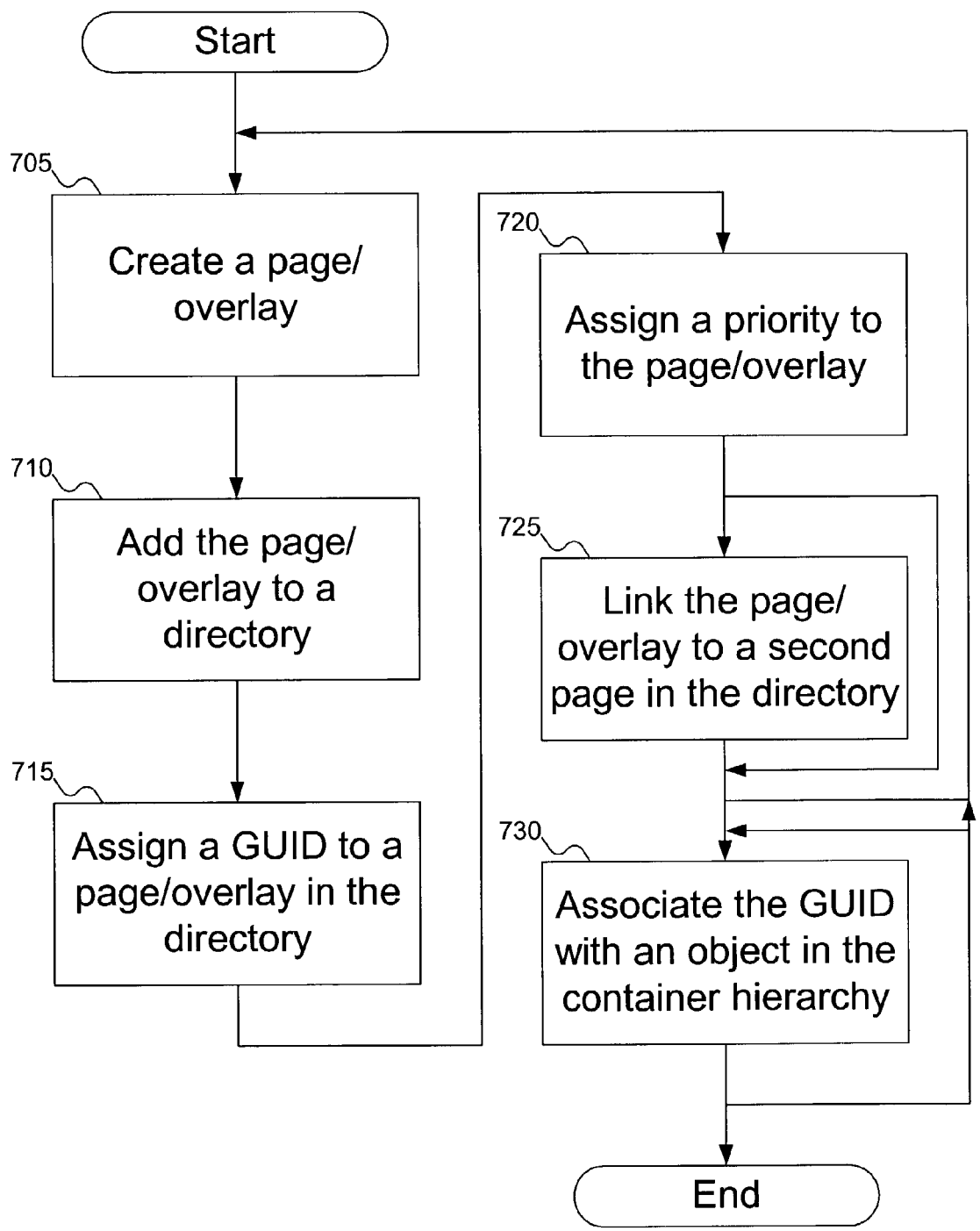
FIG. 7 shows a flowchart of the procedure for adding a portal page or page overlay to the page directory of FIG. 2 and associating the page with an object in the container hierarchy of FIG. 3, according to an embodiment of the invention.

FIG. 7 shows a flowchart of the procedure for adding a portal page or page overlay to the page directory of FIG. 2 and associating the page with an object in the container hierarchy of FIG. 3, according to an embodiment of the invention. At step 705, a page or page overlay is created. At step 710, the page or page overlay is added to the page directory. At step 715, the page or page overlay is assigned a GUID. At step 720, the page or page overlay is assigned a priority. At step 725, the page or page overlay is linked to another page in the page directory. Note that this step is optional if the page has no parent page, no child pages, and no associated page overlays. But parent pages, child pages, and page overlays need to be linked to related pages in the page directory. Finally, at step 730 the GUID of the page or page overlay is associated with an object in the container hierarchy.

Although the above description of the steps in FIG. 7 is linear, the order of the steps can vary somewhat from the sequence indicated. For example, numerous pages or page overlays can be created at one time, several pages or page overlays can be inserted into the page directory at one time, etc. Similarly, the GUID for the page or page overlay does not need to ever be associated with an object in the container hierarchy, let alone to do so immediately after adding the page or page overlay to the page directory. A person skilled in the art will recognize other variations on FIG. 7.

Figure 8:
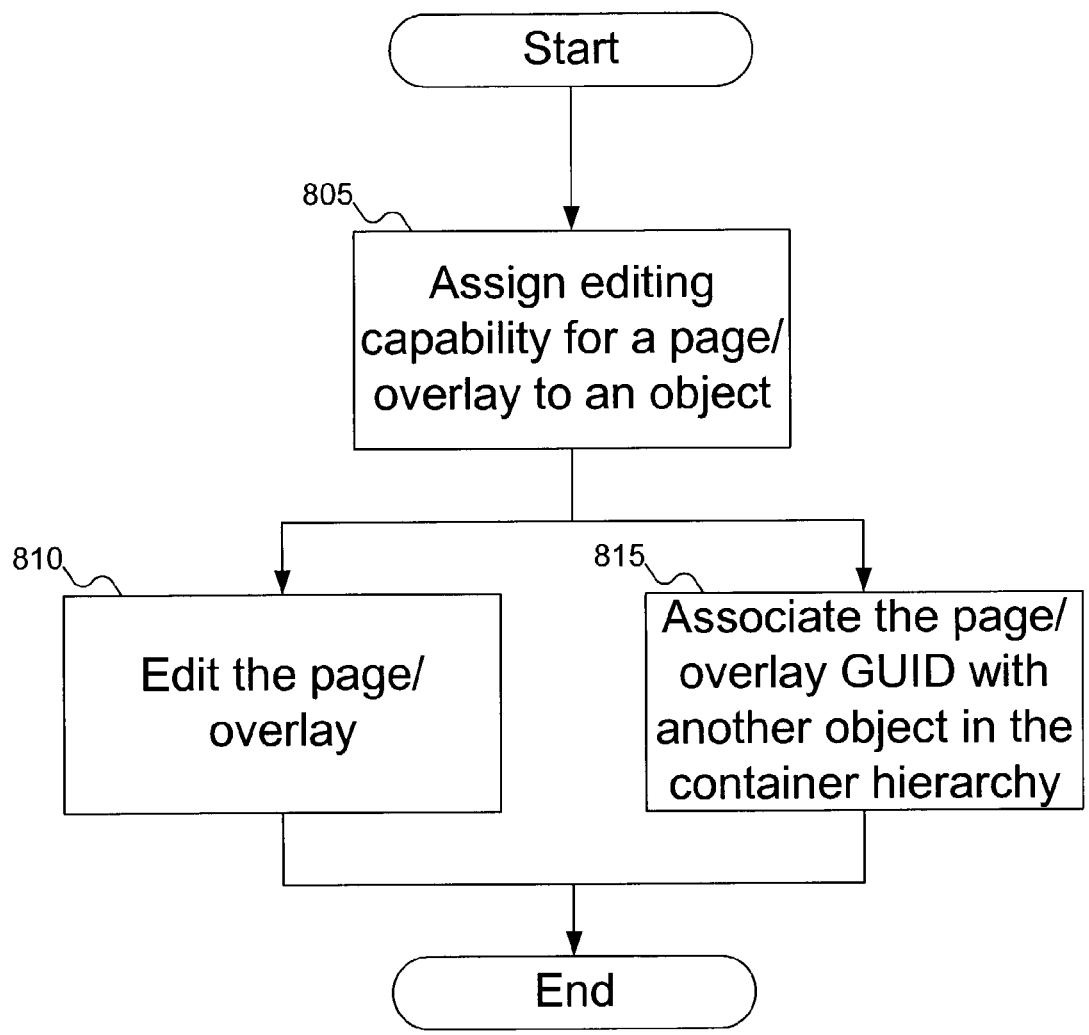
FIG. 8 shows a flowchart of the procedure for granting editing capability for a portal page or page overlay in the page directory of FIG. 2 to an object in container hierarchy of FIG. 3, according to an embodiment of the invention.
Figure 9A:
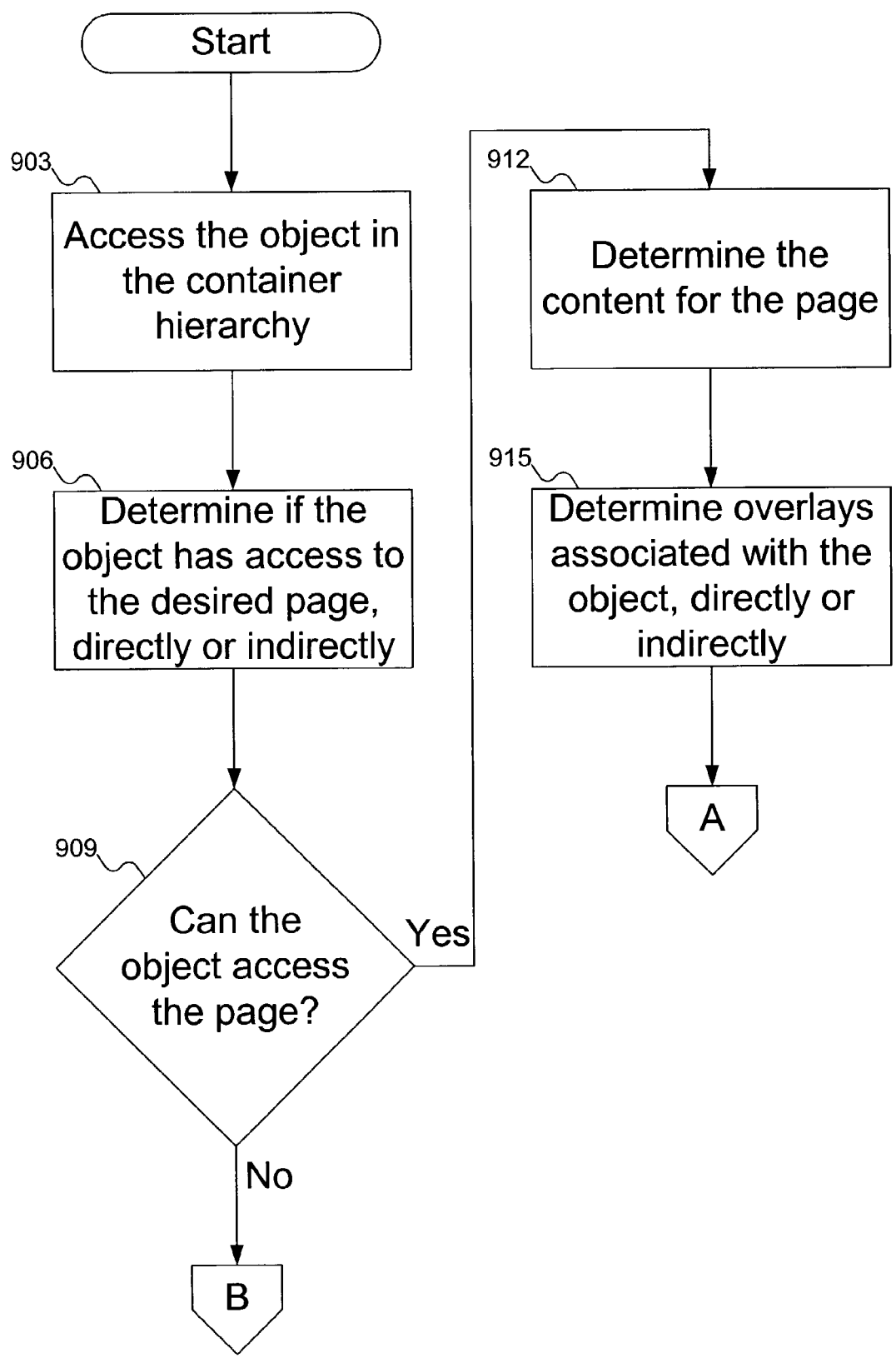
FIGS. 9A–9E show a flowchart of the procedure for displaying a portal page from the page directory of FIG. 2 based on an object in the container hierarchy of FIG. 3, according to an embodiment of the invention.
Figure 9B:
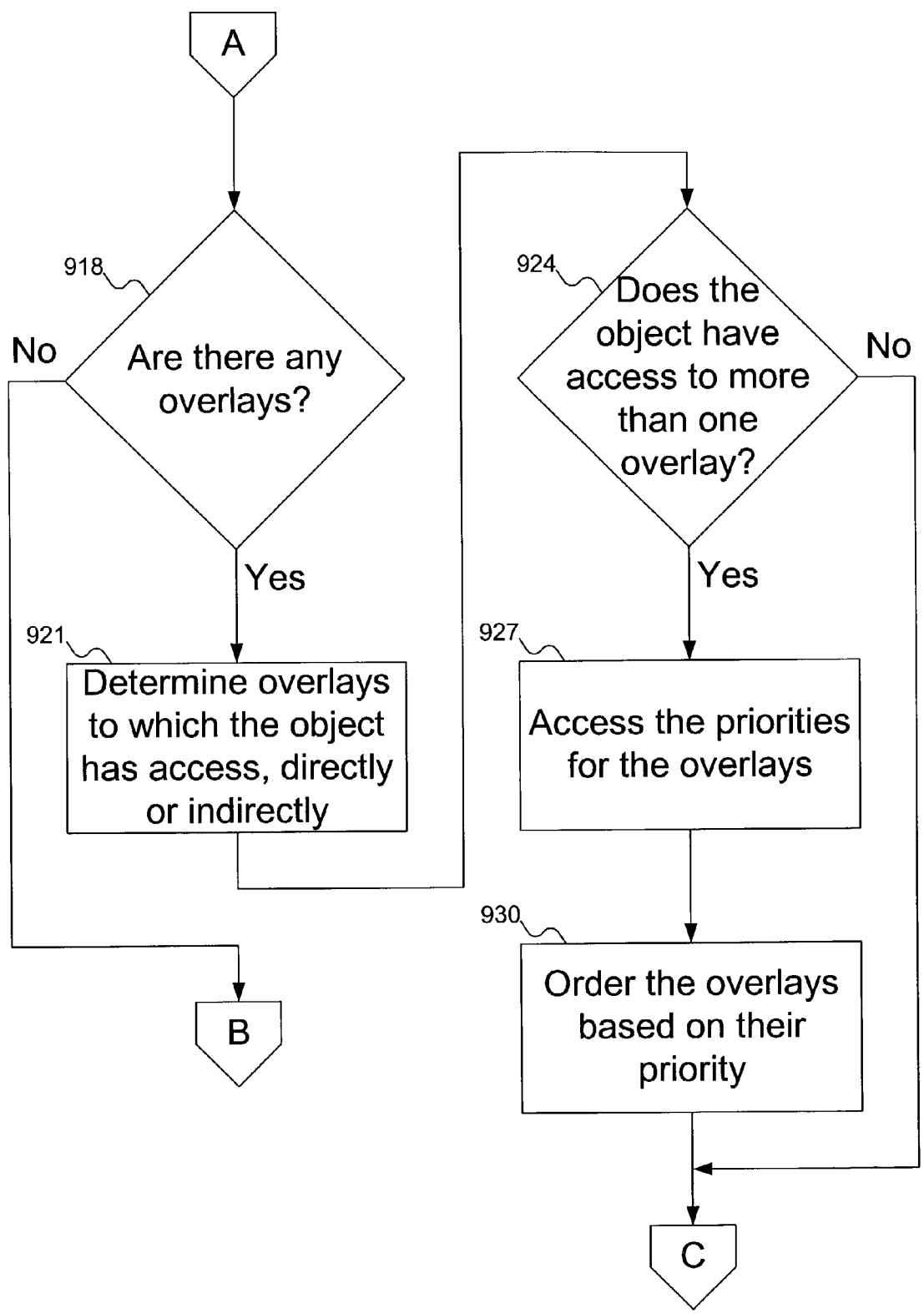
Figure 9C:
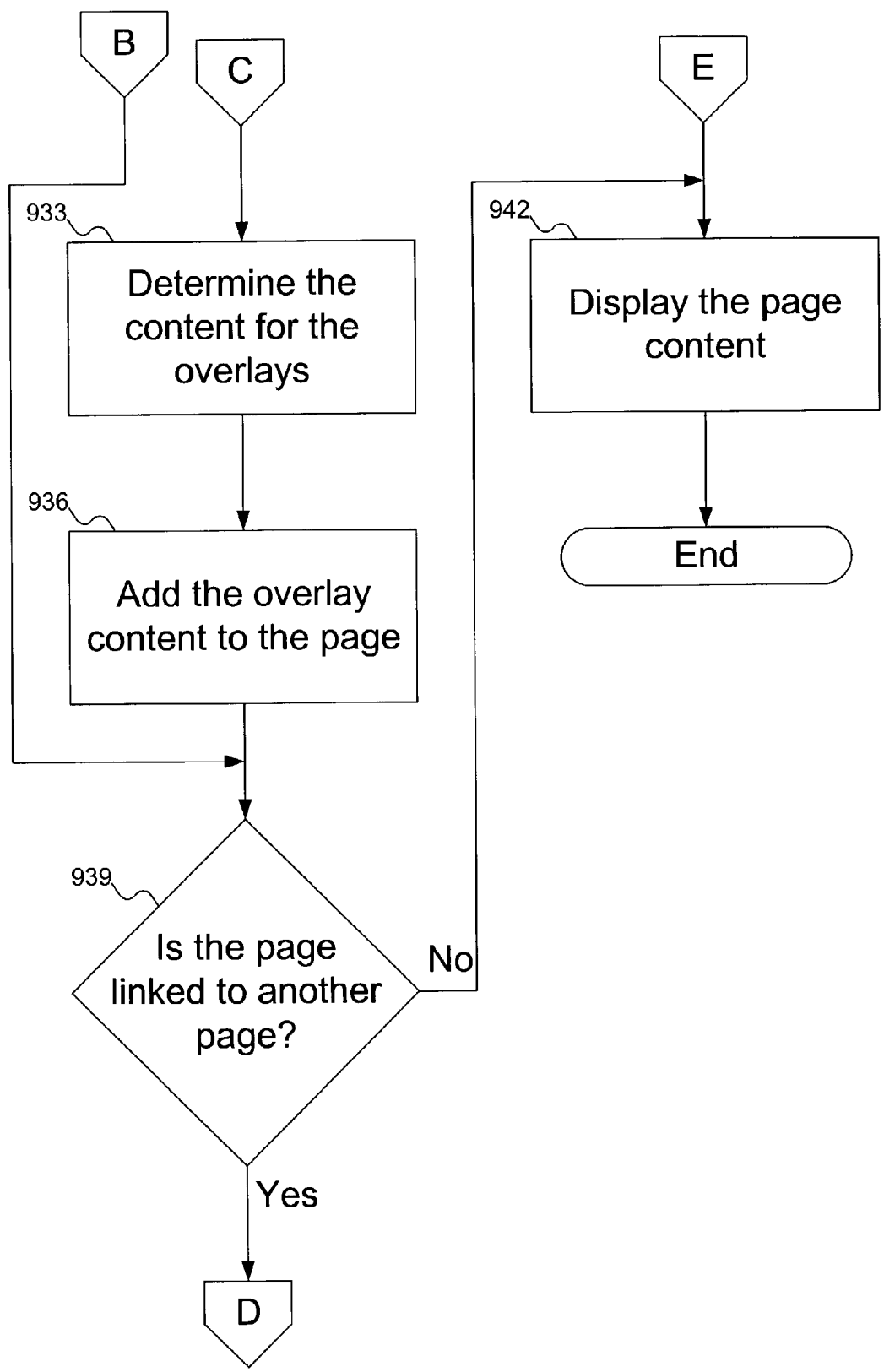
Figure 9D:
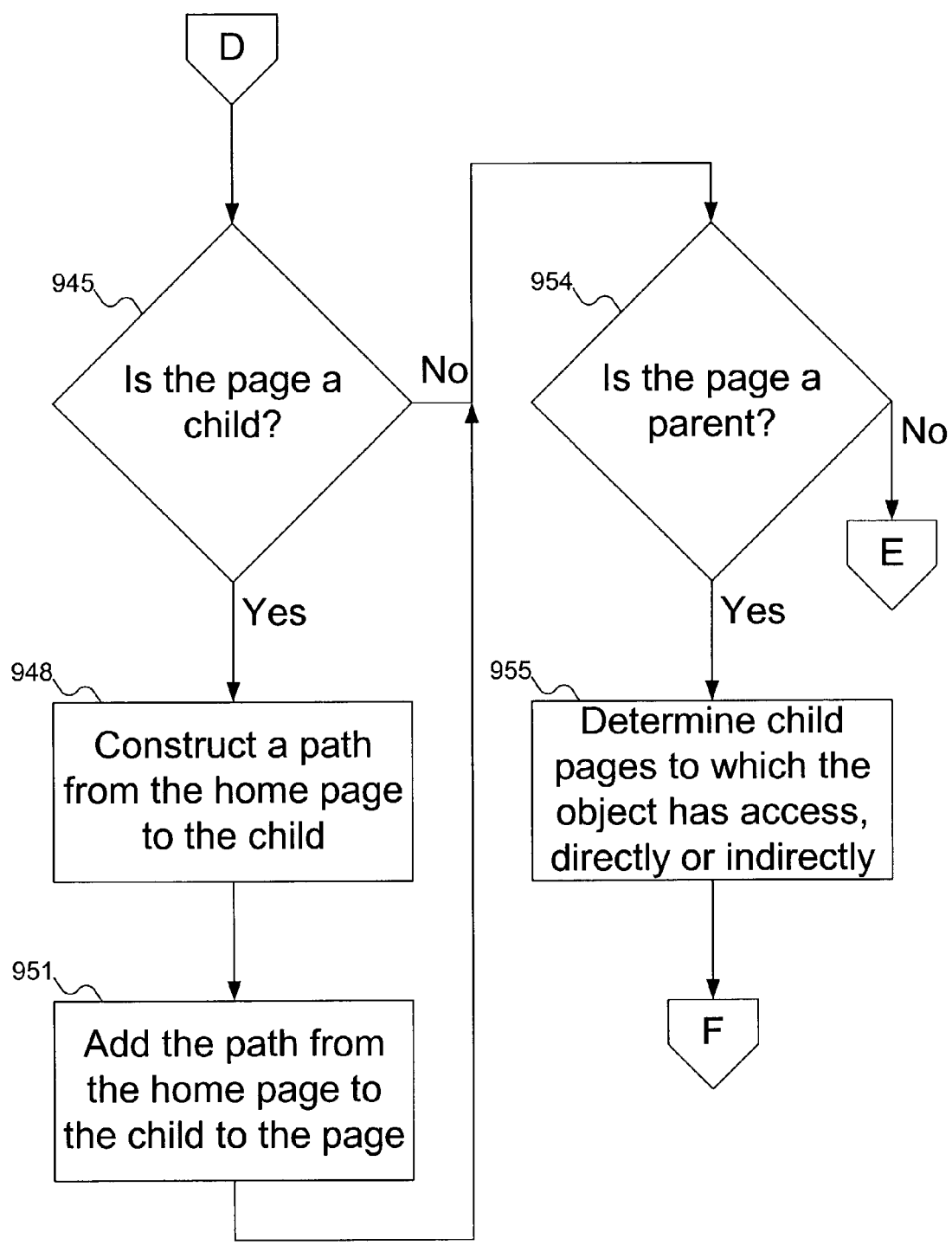
Figure 9E:
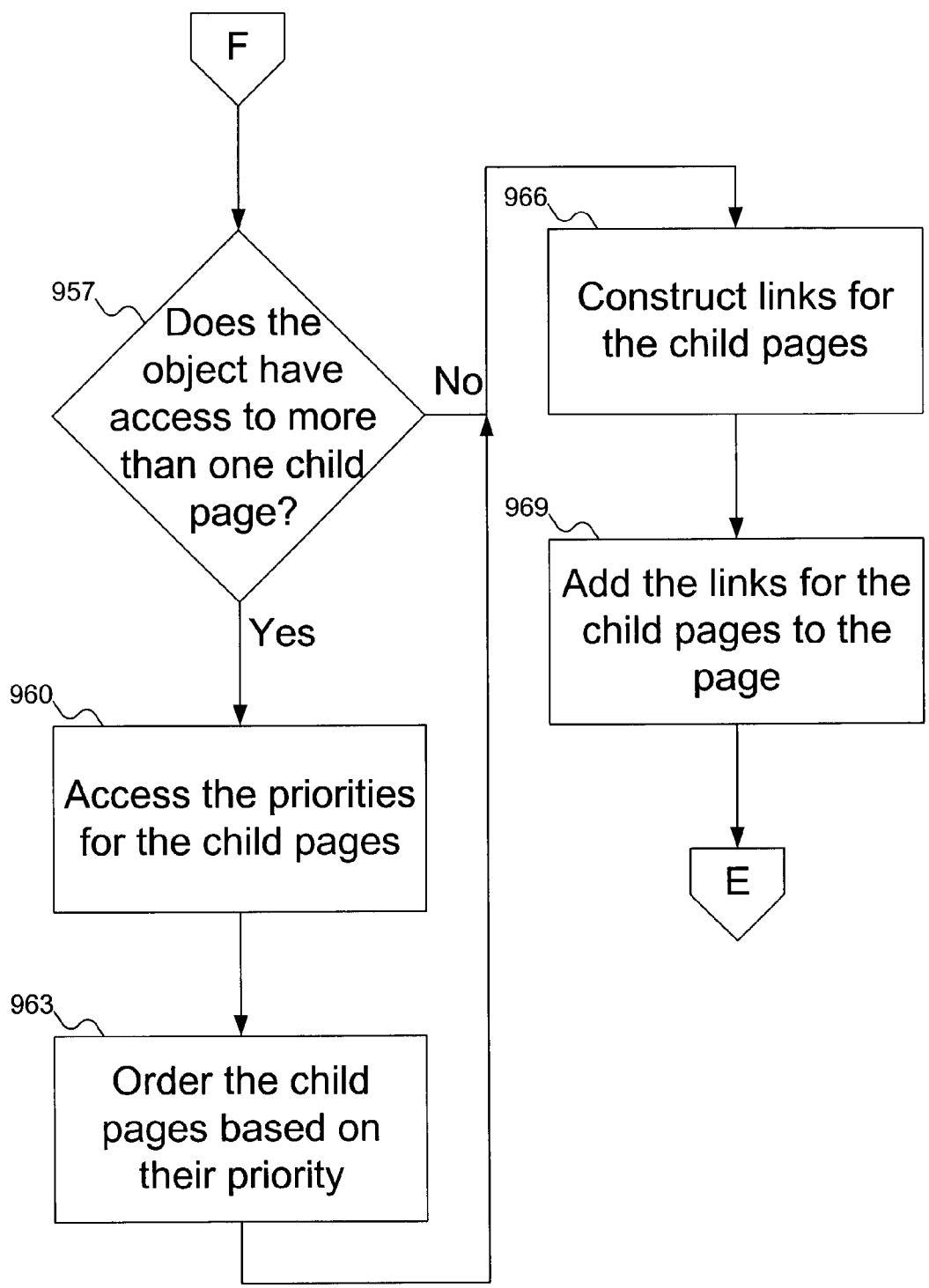

FIG. 8 shows a flowchart of the procedure for granting editing capability for a portal page or page overlay in the page directory of FIG. 2 to an object in container hierarchy of FIG. 3, according to an embodiment of the invention. At step 805, an object in the container hierarchy is assigned editing capabilities for the page or page overlay. This is done either by the administrator or by the creator of the page or page overlay. At step 810, a suer who has been assigned editing rights (either directly or indirectly) edits the object. Alternatively, at step 815, the user who has been assigned editing rights can associate the GUID of the page or page overlay with another object in the container hierarchy (thereby granting permission for others to view or edit the page). Note that steps 810 and 815 can be performed repeatedly and in any order: they are not mutually exclusive steps, nor is either step required. For example, a user can be given rights to edit the page or page overlay, as shown in step 810, but not to associate the page or page overlay with an object in the container hierarchy, as shown in step 815.

FIGS. 9A–9E show a flowchart of the procedure for displaying a portal page from the page directory of FIG. 2 based on an object in the container hierarchy of FIG. 3, according to an embodiment of the invention. At step 903 (FIG. 9A), the object in the container hierarchy is accessed. Typically, the object will be an object for a user, but a person skilled in the art will recognize that other types of objects can exist. For example, a spider or robot (an automated program that searches a network for information) can have an object in the container hierarchy. For simplicity of description below, the term user includes all such possible meanings. At step 906, the object is accessed to determine what pages and page overlays the user has permission to view. This includes inheriting any access rights from other objects in the container hierarchy. At step 909, the object is checked to see if the user has direct permission to view the page. If the user has permission to view the page, then at step 912 the content for the page is determined. At step 915, any overlays associated with the page are determined.

At step 918 (FIG. 9B), the system checks to see if there are any page overlays associated with the desired page. If there are any page overlays for the desired page, then at step 921 the object is examined to determine which of the page overlays the user has permission to view. At step 924, the system counts the number of page overlays associated with the desired page to which the user has access (either directly or indirectly). If there user has access to more than one page overlay, then at step 927 the priorities for the page overlays are accessed, and at step 930 the page overlays are ordered based on their priorities.

Provided the user has access rights in at least one page overlay, at step 933 (FIG. 9C) the content for the overlays to which the user has access rights are determined, and at step 936 the overlay content is added to the page content (reflecting the ordered determined in step 930 if there are multiple page overlays). At this point, the content to display to the user has been determined. All that remains is to assemble the links to other pages. Thus, even if there were no page overlays, or if the user did not have permission to view th desired page, processing continues with step 939.

At step 939, the system checks to see if the desired page is linked to another page (either as a parent or as a child). If the page is not linked to any other pages, then at step 942 the page is displayed and processing is complete. Otherwise, at step 945 (FIG. 9D), the system checks to see if the page is a child of another page. If the page is a child page, then at step 948 the path from the home page (that is, the root of the tree in which the desired page exists) is determined, and at step 951 the path from the root of the tree to the desired page is added to the content to be displayed. In a preferred embodiment, a page is part of only one tree in the page directory. But often it happens that trees are cross-linked, to share related information. There are a number of ways of addressing this situation. A preferred way is to identify the page as belonging to only one tree, and to ignore any pages that link to the page from another tree. But a person skilled in the will recognize that other solutions are possible. For example, the page can include the path to the root of every tree to which the page is linked (although this is a cumbersome solution).

At step 954, the system checks to see if the page is a parent page (that is, it is linked to any pages that are its children). If so, then at step 955 the system determines to which child pages the object has access, either directly or indirectly. At step 957 (FIG. 9E), the system checks to see if the object has permission to access more than one child page. If so, then at step 960 the system accesses the child pages and determines their respective priorities. At step 963, the system orders the child pages according to their priorities. At step 966, the system constructs paths from the desired page to each child page, and at step 969 the system adds the links to the desired page.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. An apparatus for displaying a portal web page, the apparatus comprising:
    a computer including a storage;
    a portal web page stored in the storage of the computer;
    a first globally unique identifier (GUID) assigned to the portal web page;
    a container hierarchy including an object, the object associated with the first GUID assigned to the portal web page;
    a first page overlay;
    a second GUID assigned to the first page overlay;
    a link between the portal web page and the page overlay;
    a first content for the portal web page;
    a second content for the first page overlay;
    a second page overlay;
    a third content for the second page overlay;
    a third GUID assigned to the second page overlay;
    a first priority for the first page overlay;
    a second priority for the second page overlay;
    a sorter to order the first page overlay and the second page overlay based on the first and second priorities; and
    means for combining the first, second, and third contents if the second and third GUIDs are associated with the object in the container hierarchy.

2. The apparatus according to claim 1, further comprising a fourth GUID assigned to a second portal web page.

3. The apparatus according to claim 2, further comprising means for displaying a link from the portal web page to the second portal web page if the fourth GUID is associated with the object in the container hierarchy.

4. The apparatus according to claim 2, further comprising means for displaying a link from the second portal web page to the portal web page if the fourth GUID is associated with the object in the container hierarchy.

5. The apparatus according to claim 2, further comprising:
    a fifth GUID assigned to a third portal web page;
    a third priority assigned to the second portal web page;
    a fourth priority assigned to the third portal web page;
    wherein the sorter to further order a link to the second portal web page and a link to the third portal web page based on the third and fourth priorities; and
    means for displaying the ordered links to the second and third portal web pages.

6. The apparatus according to claim 1, further comprising means for marking the object as having permission to edit the portal web page.

7. The apparatus according to claim 1, further comprising means for combining the portal web page and the first page overlay if the second GUID is associated with the object in the container hierarchy.

8. A computer-implemented method for accessing a portal web page, the computer-implemented method comprising:
    assigning a first globally unique identifier (GUID) to a portal web page;
    associating the first GUID with an object in a container hierarchy;
    associating a second GUID to a first page overlay;
    linking the portal web page to the first page overlay;
    associating a third GUID to a second page overlay;
    linking the portal web page to the second page overlay;
    assigning a first priority to the first page overlay;
    assigning a second priority to the second page overlay;
    ordering a first content of the first page overlay and a second content of the second page overlay based on the first and second priorities; and
    displaying the first and second contents in combination with a content of the portal web page the portal web page based on the ordering of the first and second contents if the second and third GUIDs are associated with the object in the container hierarchy.

9. The computer-implemented method according to claim 8, wherein associating the first GUID includes associating the first GUID with the object for a user in the container hierarchy.

10. The computer-implemented method according to claim 8, wherein displaying the portal web page includes indirectly inheriting the first GUID from the object by a user.

11. The computer-implemented method according to claim 8, further comprising associating a fourth GUID of a second portal web page with the portal web page.

12. The computer-implemented method according to the claim 11, wherein displaying the portal web page includes displaying a link from the portal web page to the second portal web page if the fourth GUID is associated with the object in the container hierarchy.

13. The computer-implemented method according to claim 11, wherein displaying the portal web page includes:
    constructing a display path from the second portal web page to the portal web page; and
    displaying the display path if the fourth GUID is associated with the object in the container hierarchy.

14. The computer-implemented method according to claim 11, further comprising:
    associating a fifth GUID of a third portal web page with the portal web page;
    assigning a third priority to the second portal web page;
    assigning a fourth priority to the third portal web page;

ordering a link to the second portal web page and a link to the third portal web page based on the third and fourth priorities; and displaying the ordered links to the second and third portal web pages if the fourth and fifth GUIDs are associated with the object in the container hierarchy.

15. The computer-implemented method according to claim 8, further comprising assigning an editing right to the object in the container hierarchy.

16. The computer-implemented method according to claim 15, wherein:
the method further comprises editing the portal web page; and
displaying the portal web page includes displaying the edited portal web page.

17. The computer-implemented method according to claim 15, further comprising associating the first GUID with a second object in the container hierarchy by a user related to the object in the container hierarchy.

18. The computer-implemented method according to claim 8, wherein displaying the portal web page includes displaying a combination of the portal web page and the first page overlay if the second GUID is associated with the object in the container hierarchy.

19. Computer-readable media containing a program to access a portal web page, comprising:
a portal web page;
a first globally unique identifier (GUID) assigned to the portal web page;
a container hierarchy, containing an object, the first GUID assigned to the portal web page associated with the object
a first page overlay;
a second GUID assigned to the first page overlay;
a second page overlay;
a third GUID assigned to the second page overlay; and
software to prioritize the first page overlay and the second page overlay; and
software to display the portal web page overlaid with the first page overlay and the second page overlay according to their priorities if the second and third GUIDs are associated with the object.

20. The computer-readable media containing the program according to claim 19, further comprising:
a second portal web page;
a fourth GUID assigned to the second portal web page; and
software to display the portal web page and a link to the second portal web page if the fourth GUID is associated with the object.

21. The computer-readable media containing the program according to claim 20, wherein:
the program further comprises:
a third portal web page;
a fifth GUID assigned to the third portal web page; and
software to prioritize the portal web page and the second portal web page; and
the software to display includes a second software to display the portal web page and links to the second and third portal web pages according to their priorities if the fourth and fifth GUIDs are associated with the object.

* * * * *

UNITED STATES PATENT AND TRADEMARK OFFICE
CERTIFICATE OF CORRECTION

| | | |
|---|---|---|
| PATENT NO. | : 7,149,960 B1 | Page 1 of 1 |
| APPLICATION NO. | : 10/198005 | |
| DATED | : December 12, 2006 | |
| INVENTOR(S) | : Matthew G. Brooks et al. | |

It is certified that error appears in the above-identified patent and that said Letters Patent is hereby corrected as shown below:

Column 10, line 50, the words "according to the claim" should be replaced with --according to claim--.

Signed and Sealed this

Twenty-third Day of September, 2008

JON W. DUDAS
*Director of the United States Patent and Trademark Office*